(12) United States Patent
Proctor (10) Patent No.: US 11,709,807 B2
(45) Date of Patent: Jul. 25, 2023

(54) OPTIMIZED TENANT SCHEMA GENERATION

(71) Applicant: Red Hat, Inc., Raleigh, NC (US)

(72) Inventor: Howard Proctor, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/241,507

(22) Filed: Apr. 27, 2021

(65) Prior Publication Data

US 2022/0342856 A1 Oct. 27, 2022

(51) Int. Cl.
*G06F 16/21* (2019.01)
*G06F 16/242* (2019.01)

(52) U.S. Cl.
CPC .......... *G06F 16/211* (2019.01); *G06F 16/214* (2019.01); *G06F 16/2433* (2019.01)

(58) Field of Classification Search
CPC ... G06F 16/211; G06F 16/214; G06F 16/2433
See application file for complete search history.

(56) References Cited

U.S. PATENT DOCUMENTS

| | | | |
|---|---|---|---|
| 7,089,297 B1* | 8/2006 | Salas | H04L 41/0886 713/1 |
| 8,739,030 B2 | 5/2014 | Ahuja et al. | |
| 8,793,230 B2 | 7/2014 | Engelko et al. | |
| 9,092,501 B2 | 7/2015 | Weissman et al. | |
| 9,525,731 B2 | 12/2016 | Plattner et al. | |
| 10,762,075 B2 | 9/2020 | Eberlein et al. | |
| 2009/0327311 A1* | 12/2009 | Becker | G06F 16/958 |
| 2010/0250608 A1 | 9/2010 | Malviya et al. | |
| 2011/0219046 A1* | 9/2011 | Nesmyanovich | G06F 16/00 707/812 |
| 2012/0102095 A1* | 4/2012 | Campbell | G06F 16/245 709/203 |
| 2014/0095432 A1* | 4/2014 | Trumbull | G06F 16/213 707/610 |
| 2016/0357985 A1* | 12/2016 | Wisman | G06F 21/554 |
| 2017/0034313 A1* | 2/2017 | Olivier | H04L 67/306 |
| 2019/0018874 A1* | 1/2019 | Eberlein | G06F 16/2358 |
| 2019/0236184 A1* | 8/2019 | Dvinov | G06F 16/2453 |
| 2021/0182251 A1* | 6/2021 | Eberlein | H04L 67/10 |

OTHER PUBLICATIONS

"Manage Schema in a SaaS Application that Uses Sharded Multi-Tenant Databases", https://docs.microsoft.com/en-us/azure/azure-sql/database/saas-multitenantdb-schema-management; Dec. 18, 2018 (7 pages). Retrieved on ar before Feb. 10, 2021.

(Continued)

*Primary Examiner* — Cam Y T Truong
(74) *Attorney, Agent, or Firm* — K&L Gates LLP (57) ABSTRACT

A system includes a memory and a processor, where the processor is in communication with the memory. The processor is configured to receive a request to create a tenant schema within a database, where the database includes one or more tenant schemas associated with one or more tenants. The tenant schema associated with a tenant of the one or more tenants is created, where the tenant schema is empty. It is determined whether the database includes a template schema. Upon determining the template schema exists, command is sent to the database to copy the template schema to the tenant schema associated with the tenant.

20 Claims, 4 Drawing Sheets

(56) References Cited

OTHER PUBLICATIONS

Pippal et al., "An Efficient Schema Shared Approach for Cloud Based Multitenant Database with Authentication and Authorization Framework", Oct. 2011 International Conference on P2P, Parallel, Grid, Cloud and Internet Computing (6 pages).
"Multi-Tenant Schema Migration", https//docs.citusdata.com/en/v7.4/develop/migration_mt_schema.html; 2019 (4 pages). Retrieved on or before Feb. 10, 2021.

\* cited by examiner

OPTIMIZED TENANT SCHEMA GENERATION

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Maintenance and/or modifications to installed service and/or applications may often be applied in various server or cloud environments which may be continuously evolving.

SUMMARY

The present disclosure provides new and innovative systems and methods for generating a new tenant schema associated with a tenant. In an example, a method includes receiving a request to create a tenant schema within a database, where the database includes one or more tenant schemas associated with one or more tenants. The tenant schema associated with a tenant of the one or more tenants is created, where the tenant schema is empty. Next, it is determined whether the database includes a template schema. Upon determining the template schema exists, a command is sent to the database to copy the template schema to the tenant schema associated with the tenant.

In an example, a system includes a memory and a processor, where the processor is in communication with the memory. The processor is configured to receive a request to create a tenant schema within a database, where the database includes one or more tenant schemas associated with one or more tenants. The tenant schema associated with a tenant of the one or more tenants is created, where the tenant schema is empty. It is determined whether the database includes a template schema. Upon determining the template schema exists, command is sent to the database to copy the template schema to the tenant schema associated with the tenant.

In an example, a non-transitory machine readable medium storing code, which when executed by a processor is configured to receive a request to create a tenant schema within a database, where the database includes one or more tenant schemas associated with one or more tenants. Next, the tenant schema associated with a tenant of the one or more tenants is created, where the tenant schema is empty. It is determined whether the database includes a template schema. Upon determining the template schema exists, a command is sent to the database to copy the template schema to the tenant schema associated with the tenant.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for providing an ability to improve efficiency of creating a new tenant schema in a multi-tenant database environment. Typically, applications implementing tenant schemata for data separation have to create a new database schema when a new tenant is created via the application. Generally, schema creation involves database migration managed by a third party piece of software (e.g., a migration manager). Typically, each additional migration generates more files causing each subsequent migration to become less efficient and consume more system resources.

As described in various examples disclosed herein, to facilitate reducing system overhead during a tenant schema creation process, the systems and methods disclosed herein advantageously use a template tenant schema to optimize resource usage. In various implementations, a database system may include a tenant schema stored within the database. In these implementations, the tenant schema may mirror a structure of other one or more other tenant schemas within the database system. In some implementations, a tenant schema may include one or more records. In many implementations, an application may execute a database system command to generate a new tenant schema based on a template schema, where the database system command may be executed internal to the database system. In certain implementations, if a template schema does not exist, an application may execute a third party piece of software to generate the template schema to generate new schemas associated with new and/or current tenants. In some instances, an application may execute a third party piece of software to directly generate a new tenant schema based on an existing schema and/or template schema. In most implementations, generating new tenant schemas internal to a database system executes more quickly than a third party piece of software generating a template schema or a new schema. In these implementations, generating new tenant schemas internal to a database system reduces an amount of processing time required to create and/or generate new tenant schemas.

Figure 1:
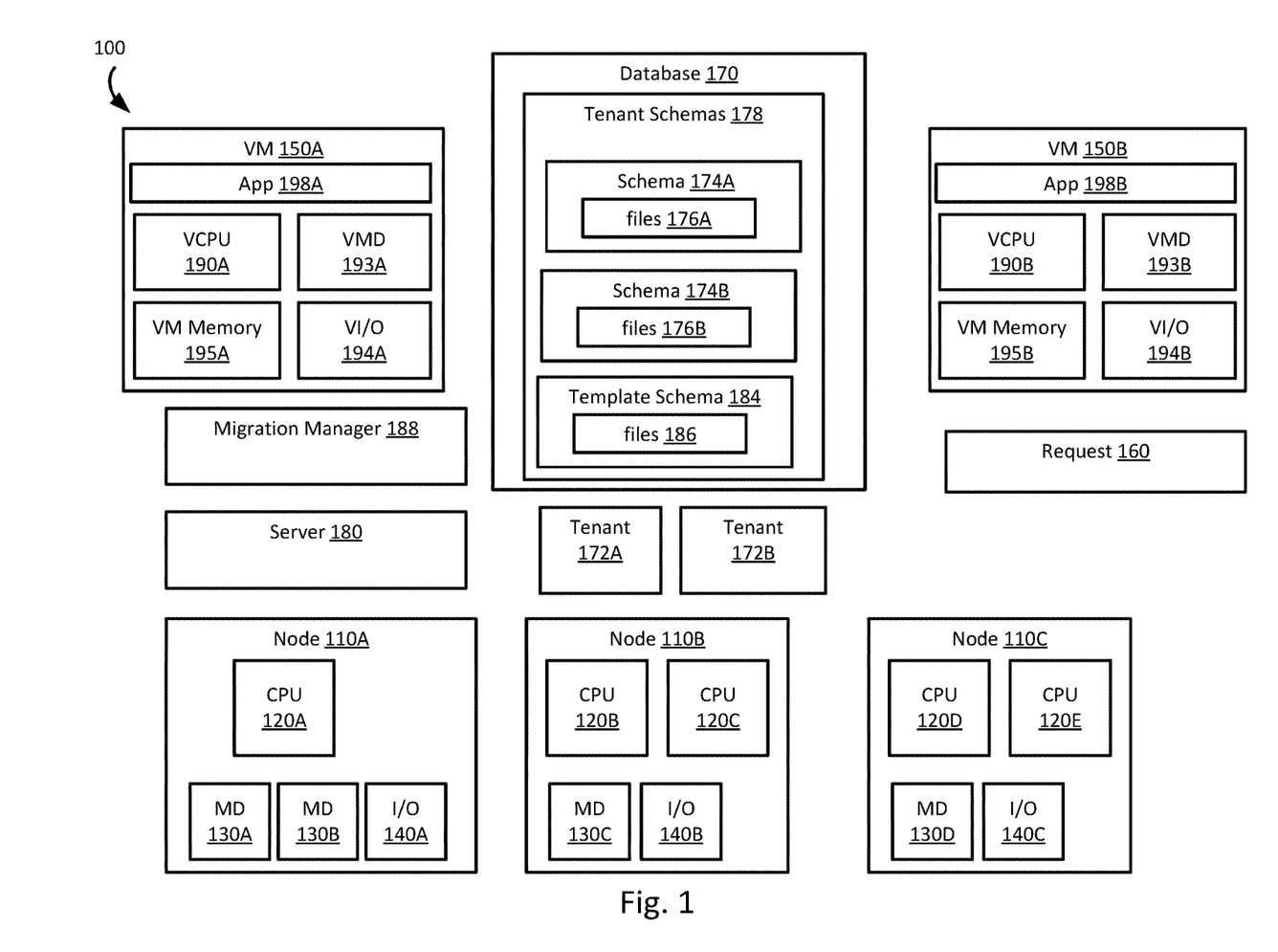
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a server 180, a database 170, migration manager 188, one or more virtual machines (VM 150A-B, 150 generally), and nodes (e.g., nodes 110A-C, 110 generally). A database 170 may run on a virtual machine (e.g., VM 150A-B, 150 generally) or on a node (e.g., node 110A-C, 110 generally). The database 170 may include tenant schemas 178, which may include schemas (174A-B, 174 generally) and a template schema 184. A tenant (172A-B, 172 generally) may be operable to access one or more of the tenant schemas 178. A tenant 172 may be a group a users and/or accounts having common access and common privileges to the database. As shown, tenant schemas 178 and template schema 184 are comprised of files (176A-B, 176 generally) and files 186 respectively. For example, files 186 or files 176 may include one or more migration files, a migration table, records, and/or other files used to generate a schema 174.

In various implementations, a template schema (e.g., schema 184) may be identical to one or more other schemata (e.g., tenant schemas 178) in a database system (e.g., system 100) that may be backing an application (e.g., application 198A or application 198B). In certain implementations, a template schema (e.g., template schema 184) may be created and maintained by a migration process and/or migration application so that migration tracking information, as well as a structure of the tenant schema, may be consistent over time with other tenant schemas on the database system. In various implementations, a schema (e.g., schema 174A) may include a plurality of files (e.g., files 176A), which may include data structures, objects, records, data associated with modifications to the schema, and/or other data. In some implementations, each time a schema (e.g., schema 174A) is changed, files (e.g., files 176) may be generated and/or updated to keep track of previous states and/or versions of the schema. In some implementations, an application (e.g., application 198A) may receive a request (e.g., request 160) to generate a new schema (e.g. schema 174B) for a new tenant (e.g., tenant 172A). In various implementations, a database system (e.g., system 170) may include a copy function, which may be a user-defined database function that may efficiently copy objects from a template schema (e.g., schema 184) to a new tenant schema (e.g., schema 174B) with respect to a new tenant (e.g., tenant 172B). A new tenant may be created and/or may exist when there are new clients, customers, and/or set of users of a database system. In various implementations, a tenant (e.g., tenant 172A) may be a group of users having common access and/or common privileges to one or more schemas (e.g., schemas 174) within a database (e.g., database 170).

In many implementations, creation of a schema (e.g., schema 174B) may be executed directly at a database system (e.g., database 170) by copying objects from a current state of a template schema (e.g., schema 184). In various implementations, a copy command or process executing internal to a database system (e.g., database 170) may be more efficient than accessing migration files (e.g., files 176A or files 176B) via a third party piece of software. In some implementations, data from a tenant schema may include a change tracking table recording changes made during each migration. In certain implementations, data from template migration tracking tables may be copied to a resulting new schema so that a migration manager (e.g., migration manager 188) may be able to maintain the new schema along with all other tenant schemata. In various implementations, executing database commands in conjunction with migration tools may result in a more efficient use of database resources as well as greatly improving the processing time of required to generate tenants and/or tenant schemas. In most implementations, processing time may only grow if a significantly greater number of database objects are created or a much larger amount of data initialization is required.

In most implementations, a template schema may be maintained by an application (e.g., a migration manager 188) matching the template schema with other existing tenant schemata in a database. In various implementations, a current state or latest state of a template schema may be used to create new tenant schema utilizing a far faster and more efficient process.

Virtual machines 150A-B may include a virtual machine memory (VM Memory), a virtual CPU (VCPU), virtual memory devices (VMD), and virtual input/output devices (VI/O). For example, virtual machine 150A may include virtual machine memory 195A, a virtual CPU 190A, a virtual memory devices 193A, and a virtual input/output device 194A. Similarly, virtual machine 150B may include virtual machine memory 195B, a virtual CPU 190B, a virtual memory devices 193B, and virtual input/output device 194B. In an example, applications 198A-B may be different applications or services. In another example, applications 198A-B may be different instances of the same application or service.

In an example, a virtual machine 150A may execute a guest operating system and run applications 198A-B which may utilize the underlying VCPU 190A, VMD 193A, and VI/O device 194A. One or more applications 198A-B may be running on a virtual machine 150A under the respective guest operating system. A virtual machine (e.g., VM 150A-B, as illustrated in FIG. 1) may run on any type of dependent, independent, compatible, and/or incompatible applications on the underlying hardware and operating system ("OS"). In an example, applications (e.g., App 198A-B) run on a virtual machine 150A may be dependent on the underlying hardware and/or OS. In another example embodiment, applications 198A-B run on a virtual machine 150A may be independent of the underlying hardware and/or OS. For example, application 198A run on a first virtual machine 150A may be dependent on the underlying hardware and/or OS while application (e.g., application 198B) run on a second virtual machine (e.g., VM 150B) is independent of the underlying hardware and/or OS. Additionally, applications 198A-B run on a virtual machine 150A may be compatible with the underlying hardware and/or OS. In an example embodiment, applications 198A-B run on a virtual machine 150A may be incompatible with the underlying hardware and/or OS. For example, application 198A run on one virtual machine 150A may be compatible with the underlying hardware and/or OS while applications 198B run on another virtual machine 150B are incompatible with the underlying hardware and/or OS.

In an example, virtual machines 150A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-B or services (e.g., microservices) may run in a software container or a virtual machine (e.g., virtual machines 150A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 150A-B may be provisioned on the same host or node (e.g., node 110A) or different nodes. For example, VM 150A and VM 150B may both be provisioned on node 110A. Alternatively, VM 150A may be provided on node 110A while VM 150B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
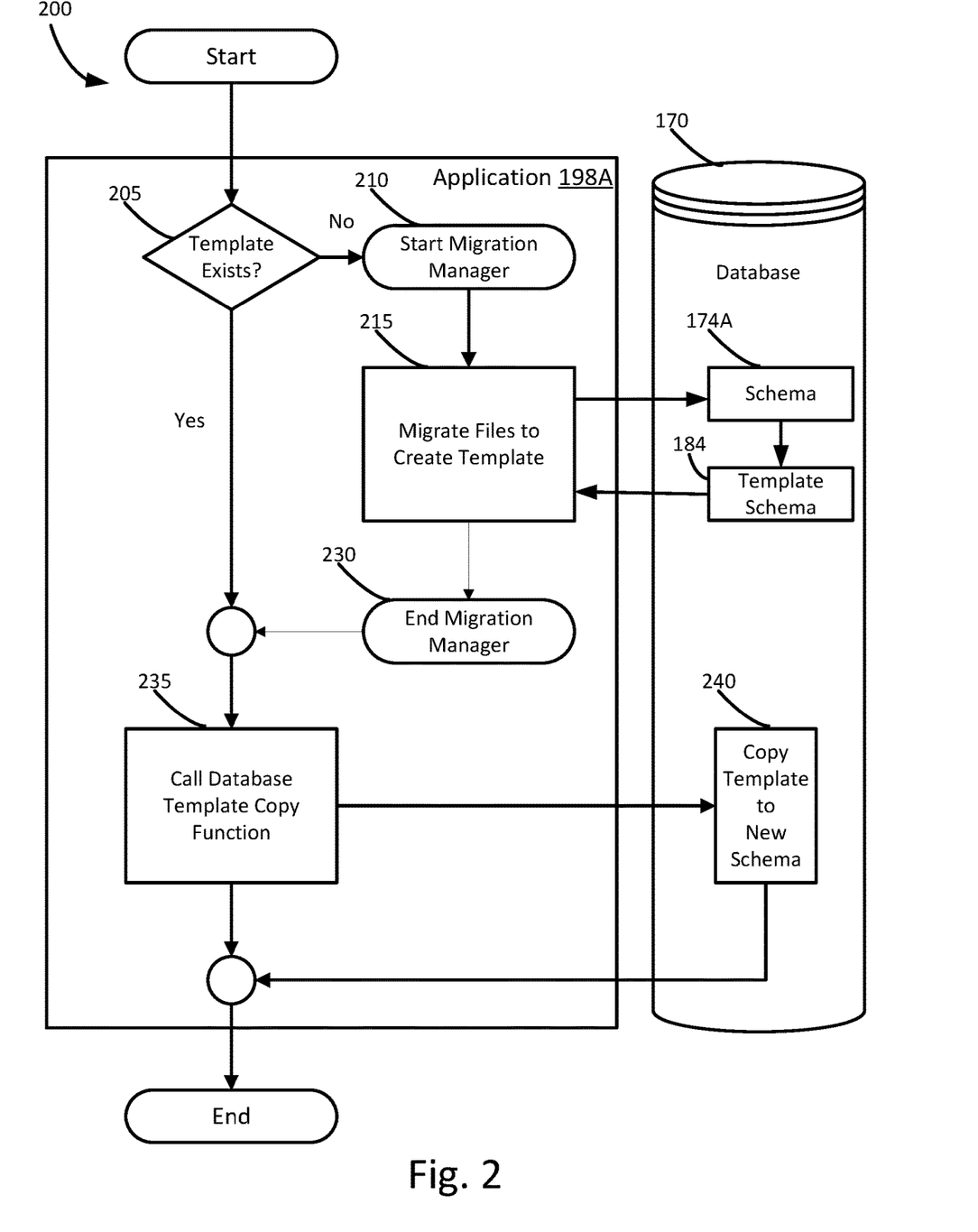
FIG. 2 illustrates a flow diagram of an application generating a new tenant schema within a database system in accordance with one or more aspects of the present disclosure.

FIG. 2 illustrates a flow diagram of an application generating a new tenant within a database system, in accordance with one or more aspects of the present disclosure. Although the example method 200 is described with reference to the flow diagram illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. For example, in the illustrated flow diagram, an application 198 is operating a migration manager 188 and interacting with a database system 170 to generate a new schema 174A from a template schema 184.

As shown in FIG. 2, application 198A determines whether template schema 184 exists (block 205). Upon determining that template schema 184 exists, the application 198A calls a database template copy function (block 235). The database 170, upon receiving the function call, copies the template tenant 184 to a new tenant schema 174B (FIG. 1) (block 240). In this instance, database 170 copies template schema 184 to schema 174B and files 186 to files 176B. If the application 198A determines that a template schema does not exist (block 205), the application 198A executes a migration manager 188 (block 210) to generate a template schema 184. Migration manager 188 communicates with the database 170 and migrates files from an existing tenant (e.g., tenant 174A) or a new tenant within database 170 to template tenant 184 (block 215). Once migration is completed (block 230), the application 198A continues generating a new tenant schema 174B as shown in block 235 and block 240.

Figure 3:
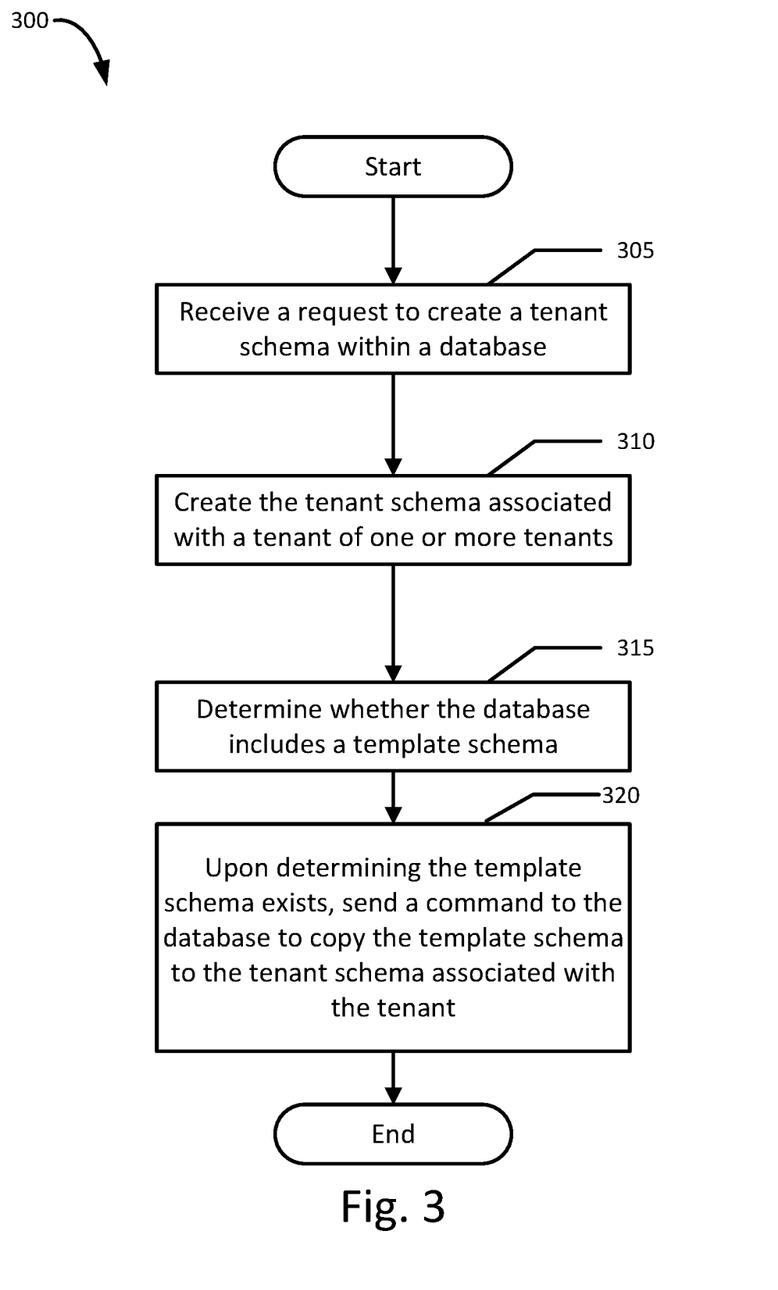
FIG. 3 illustrates a flowchart of an example method of creating a new tenant schema within a database according to an example embodiment of the present disclosure.

FIG. 3 illustrates a flowchart of an example method of creating a new tenant within a database, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

As shown in FIG. 3, an example method 300 may begin with receiving a request to create a tenant schema within a database (block 305). The database may include one or more tenant schemas associated with one or more tenants. For example, in some implementations, a database (e.g., database 170) may be an employment database supporting multiple companies. The database may include a plurality of tenant schemas (e.g., tenant schemas 178) having similar data and/or information (e.g., each schema may include a first name, last name, and hire date). The plurality of tenants may include a first company (e.g., Microsoft) and a tenant for a second company (e.g., Google). In certain instances, an application (e.g., application 198A) may receive a request to create a new tenant schema associated with a new tenant (e.g., Red Hat) for a database (e.g., database 170). Next, the example method 300 may include creating the tenant schema associated with a tenant of the one or more tenants (block 310). The tenant schema is empty. For example, application 198A may send a command to database 170 to create a new tenant schema 174B. Initially, schema 174B is empty and may need to be populated to match one or more tenant schemas (e.g., tenant schemas 178) within the database 170.

Next, the example method 300 may include determining whether a database includes a template schema (block 315). For example, application (e.g., application 198A) may query and/or determine whether a database (e.g., database 170) includes a template schema (e.g., template schema 184). Next, the example method 300 may include upon determining the template schema exists, sending a command to the database to copy the template schema to the tenant schema associated with the tenant (block 320). For example, upon determining that a template schema (e.g., template schema 184) exists, an application (e.g., application 198A) may send a command to a database (e.g., database 170) to copy the template schema (e.g., template schema 184) to the schema (e.g., schema 174B) associated with the tenant (e.g., tenant 172A).

In various implementations, upon determining that a database (e.g., database 170) lacks a template tenant, an application (e.g., application 198A) may migrate a second schema (e.g., schema 174A) to a new schema (e.g., schema 174B) associated with a tenant (e.g., tenant 172B). In certain implementations, migration of a schema may be executed and/or processed using a migration manager (e.g., migration manager 188). In various implementations, a migration of a schema may include copying each file (e.g., files 176A) associated with a schema (e.g., schema 174A) to another schema (e.g., schema 174B). In some implementations, a schema (e.g., schema 174A) may include a record of modifications (e.g., files 176A) made to each schema. In various implementations, an application (e.g., application 198A) may direct a migration manager (e.g., migration manager 188) to create a template schema (e.g., schema 176). In these implementations, the migration manager may migrate a second schema from a second tenant (e.g., tenant 172A) to the template tenant (e.g., template tenant 184). In various implementations, a migration manager may create a template tenant (e.g., template tenant 184) by creating a new empty schema, updating the new empty schema according to migration files (e.g., files 176A) of other schemas (e.g., schema 174A). In some instances, a template schema (e.g., schema 184) may include tables (e.g., files 186) corresponding to each schema stored within a database (e.g., database 170). In various implementations, a tenant (e.g., tenant 172) may be a group of users having common access and/or common privileges to a database (e.g., database 170). In certain implementations, tenant may be used interchangeably with namespace. In various implementations, migration may include recording a state of migrations of other tenant schemas (e.g., tenant schemas 178) on a database (e.g., database 170) to resolve a state of a template schema (e.g., template schema 184), where the template schema may include a current state of each of the tenant schemas on the database. In certain implementations, a template schema (e.g., template schema 184) may be updated with migration changes applied to other tenant schemas (e.g., tenant schemas 178) in the database (e.g., database 170).

Figure 4:
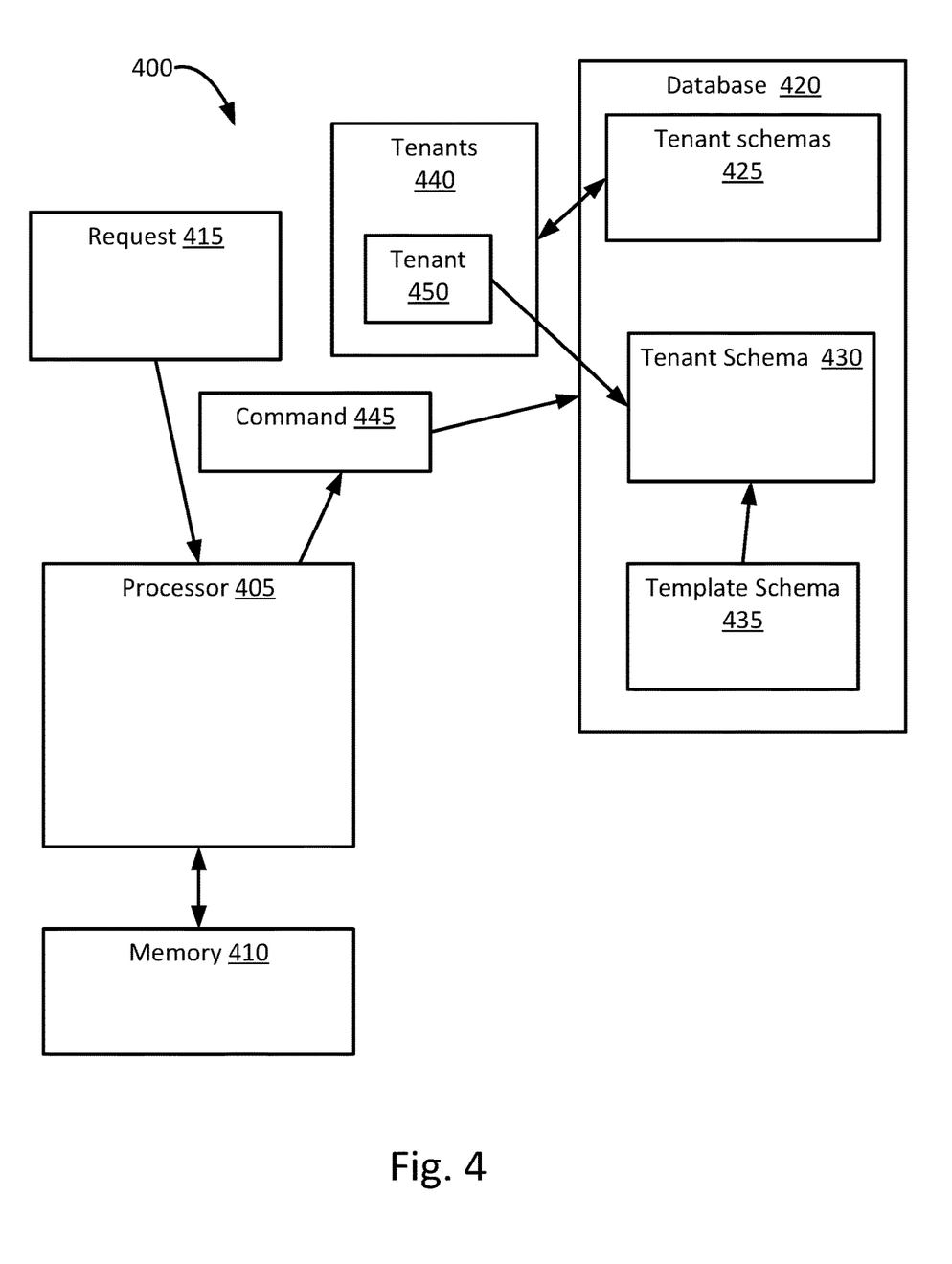
FIG. 4 illustrates a block diagram of an example computing system generating a tenant schema associated with a tenant according to an example embodiment of the present disclosure.

FIG. 4 is a block diagram of system 400 which includes a memory 410 and a processor 405. The processor 405 is in communication with the memory 410. The processor 405 receives a request 415 to create a tenant schema 430 within a database 420, where the database 420 includes one or more tenant schemas 425 associated with one or more tenants 440. The tenant schema 430 associated with the tenant 450 of the one or more tenants 440, where the tenant schema 430 is empty. The processor 405 is configured to determine whether the database 420 includes a template schema 435. Upon determining the template tenant schema 430 exists, a command 445 is sent to the database 420 to copy the template schema 435 to the tenant schema 430 associated with the tenant 450.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a memory; and a processor in communication with the memory, wherein the processor is configured to:
receive, at an application executed on a virtual machine, a request to create a tenant schema within a database, wherein the database includes one or more tenant schemas associated with one or more tenants;
in response to the request, create the tenant schema associated with a tenant of the one or more tenants, wherein the tenant schema is empty, wherein the one or more tenants have at least one of common access to or privileges to the database;
updating the empty tenant schema according to migration files of other tenant schemas;
determine whether the database includes a template schema, wherein the template schema tracks a previous state and a current state of each tenant schema of the tenant schemas on the database to create new tenant schemas;
upon determining the template schema exists, send by the application executed on the virtual machine, a copy command to the database to copy the template schema to the tenant schema associated with the tenant; and
upon determining that the database lacks a template tenant, migrate a second tenant schema to a new tenant schema, wherein the migration of the second tenant schema includes copying modifications made to another tenant schema, and wherein the migration comprises recording a state of migrations of the other tenant schemas on the database to resolve a state of the template schema.

2. The system of claim 1, wherein the processor is further configured to:
upon determining the database lacks the template schema, migrate a new schema to use as the template schema.

3. The system of claim 2, wherein migration comprises recording a state of migrations of other tenant schemas on the database to resolve a state of the template schema.

4. The system of claim 2, wherein the processor is further configured to:
update the template schema with migration changes applied to other tenant schemas in the database.

5. The system of claim 1, wherein the template schema includes tables corresponding to each schema stored within the database.

6. The system of claim 1, wherein the database is a structured query language (SQL) database.

7. The system of claim 1, wherein a tenant is a group of users having common access and common privileges to the database.

8. A method, comprising:
receiving, at an application executed on a virtual machine, a request to create a tenant schema within a database, wherein the database includes one or more tenant schemas associated with one or more tenants;
in response to the request, creating the tenant schema associated with a tenant of the one or more tenants, wherein the tenant schema is empty, wherein the one or more tenants have at least one of common access to or privileges to the database;
updating the empty tenant schema according to migration files of other tenant schemas;
determining whether the database includes a template schema, wherein the template schema tracks a previous state and a current state of each tenant schema of the tenant schemas on the database to create new tenant schemas;

upon determining the template schema exists, sending by the application executed on the virtual machine, a copy command to the database to copy the template schema to the tenant schema associated with the tenant; and upon determining that the database lacks a template tenant, migrating a second tenant schema to a new tenant schema, wherein the migration of the second tenant schema includes copying modifications made to another tenant schema, and wherein the migration comprises recording a state of migrations of the other tenant schemas on the database to resolve a state of the template schema.

9. The method of claim 8, further comprising: upon determining the database lacks the template schema, migrating a new schema to use as the template schema.

10. The method of claim 9, wherein migration comprises recording a state of migrations of other tenant schema on the database to resolve a state of the template schema.

11. The method of claim 9, wherein the processor is further configured to: updating the template schema with migration changes applied to other tenant schemas in the database.

12. The method of claim 8, wherein the template schema includes tables corresponding to each schema stored within the database.

13. The method of claim 8, wherein the database is a structured query language (SQL) database.

14. The method of claim 8, wherein the tenant is a group of users having common access and common privileges to the database.

15. A non-transitory machine readable medium storing code, which when executed by a processor is configured to:
receive, at an application executed on a virtual machine, a request to create a tenant schema within a database, wherein the database includes one or more tenant schemas associated with one or more tenants;
in response to the request, create the tenant schema associated with a tenant of the one or more tenants, wherein the tenant schema is empty, wherein the one or more tenants have at least one of common access to or privileges to the database;
update the empty tenant schema according to migration files of other tenant schemas;
determine whether the database includes a template schema, wherein the template schema tracks a previous state and a current state of each tenant schema of the tenant schemas on the database to create new tenant schemas;
upon determine the template schema exists, send by the application executed on the virtual machine a copy command to the database to copy the template schema to the tenant schema associated with the tenant; and
upon determine that the database lacks a template tenant, migrate a second tenant schema to a new tenant schema, wherein the migration of the second tenant schema includes copying modifications made to another tenant schema, and wherein the migration comprises recording a state of migrations of the other tenant schemas on the database to resolve a state of the template schema.

16. The non-transitory machine readable medium of claim 15, wherein the code, when executed by a processor, is further configured to: upon determining the database lacks the template schema, migrate a new schema to use as the template schema.

17. The non-transitory machine readable medium of claim 16, wherein migration comprises recording a state of migrations of other tenant schema on the database to resolve a state of the template schema.

18. The non-transitory machine readable medium of claim 16, wherein the code, when executed by a processor, is further configured to: update the template schema with migration changes applied to other tenant schemas in the database.

19. The non-transitory machine readable medium of claim 15, wherein the template schema includes tables corresponding to each schema stored within the database.

20. The non-transitory machine readable medium of claim 15, wherein the database is a structured query language (SQL) database.

* * * * *

UNITED STATES PATENT AND TRADEMARK OFFICE
CERTIFICATE OF CORRECTION

| | | |
|---|---|---|
| PATENT NO. | : 11,709,807 B2 | Page 1 of 1 |
| APPLICATION NO. | : 17/241507 | |
| DATED | : July 25, 2023 | |
| INVENTOR(S) | : Howard Proctor | |

It is certified that error appears in the above-identified patent and that said Letters Patent is hereby corrected as shown below:

In the Claims

In Column 10, Line 8 (Claim 15), replace "upon determine the" with -- upon determining the --.

In Column 10, Line 12 (Claim 15), replace "upon determine that" with -- upon determining that --.

Signed and Sealed this
Twenty-fourth Day of October, 2023

Katherine Kelly Vidal
*Director of the United States Patent and Trademark Office*